(12) United States Patent
Rothermel

(10) Patent No.: US 12,355,681 B2
(45) Date of Patent: Jul. 8, 2025

(54) DYNAMIC PORT SUBDIVISION

(71) Applicant: CORNELIS NETWORKS INC., Wayne, PA (US)

(72) Inventor: Brent Rothermel, Wayne, PA (US)

(73) Assignee: Cornelis Networks, Inc., Wayne, PA (US)

( * ) Notice: Subject to any disclaimer, the term of this patent is extended or adjusted under 35 U.S.C. 154(b) by 47 days.

(21) Appl. No.: 18/524,000

(22) Filed: Nov. 30, 2023

(65) Prior Publication Data

US 2025/0184289 A1   Jun. 5, 2025

(51) Int. Cl.
*H04L 49/65*   (2022.01)
*H04L 49/00*   (2022.01)
*H04L 49/55*   (2022.01)

(52) U.S. Cl.
CPC .......... *H04L 49/65* (2013.01); *H04L 49/3054* (2013.01); *H04L 49/557* (2013.01)

(58) Field of Classification Search
CPC .... H04L 49/65; H04L 49/3054; H04L 49/557
See application file for complete search history.

(56) References Cited

U.S. PATENT DOCUMENTS 7,209,453 B1 *   4/2007   Yun .................. H04L 49/555
                                                          370/242
2020/0394150 A1 *   12/2020   Lanka ............. G06F 13/4226

\* cited by examiner

*Primary Examiner* — Minh Chau Nguyen
(74) *Attorney, Agent, or Firm* — H. Artoush Ohanian; OhanianIP PLLC

(57) ABSTRACT

Methods and systems for dynamic port subdivision during link negotiation and initiation are provided. Embodiments include selecting a reference lane from port configuration information for the potential link partner; selecting a subdivision evaluation lane from the port configuration information for of the potential link partner; and comparing a GUID and port number of the reference lane with a GUID and port number of a subdivision evaluation lane. If the GUID and port number of a reference lane and the GUID and port number of a subdivision evaluation lane are not the same, embodiments include subdividing the port into a plurality of subdivided ports.

20 Claims, 5 Drawing Sheets

DYNAMIC PORT SUBDIVISION

BACKGROUND

High-Performance Computing ('HPC') refers to the practice of aggregating computing in a way that delivers much higher computing power than traditional computers and servers. In the context of HPC, network switches play a crucial role in facilitating communication between the various components of a cluster, such as servers, storage devices, and other networking equipment. Link negotiation and initialization are important processes that occur when connecting devices to these switches to establish and configure network connections.

During link negotiation, devices exchange information about their capabilities, such as supported link speeds and lane widths. They then agree on a common configuration for the connection. Switches, like any other computing device, go through an initialization or boot process when they are powered on or rebooted. This process involves self-tests, hardware initialization, and loading of the system firmware. Switch ports need to be activated and configured according to the network's requirements. For HPC clusters, this often involves setting up high-speed, low-latency connections between the compute nodes and ensuring proper network segmentation.

Properly configured and managed switches and network connections are essential for reducing bottlenecks and maximizing the computational capabilities of the HPC cluster. Some current devices have the capability to bifurcate a port into two independent fully functional ports. For example, a 4x port can be divided into two 2x ports. However, such port division has always been static. That is, the port must be configured using software prior to attempting to bring the link up. Static bifurcation has drawbacks, such as the need for user configuration of each port. It would be advantageous to dynamically subdivide a port to accommodate the highest supported link width.

BRIEF DESCRIPTION OF THE DRAWINGS

Many aspects of the present disclosure can be better understood with reference to the following drawings. The components in the drawings are not necessarily to scale, with emphasis instead being placed upon illustrating the principles of the disclosure. Moreover, in the drawings, like reference numerals designate corresponding parts throughout the several views.

DETAILED DESCRIPTION

Figure 1:
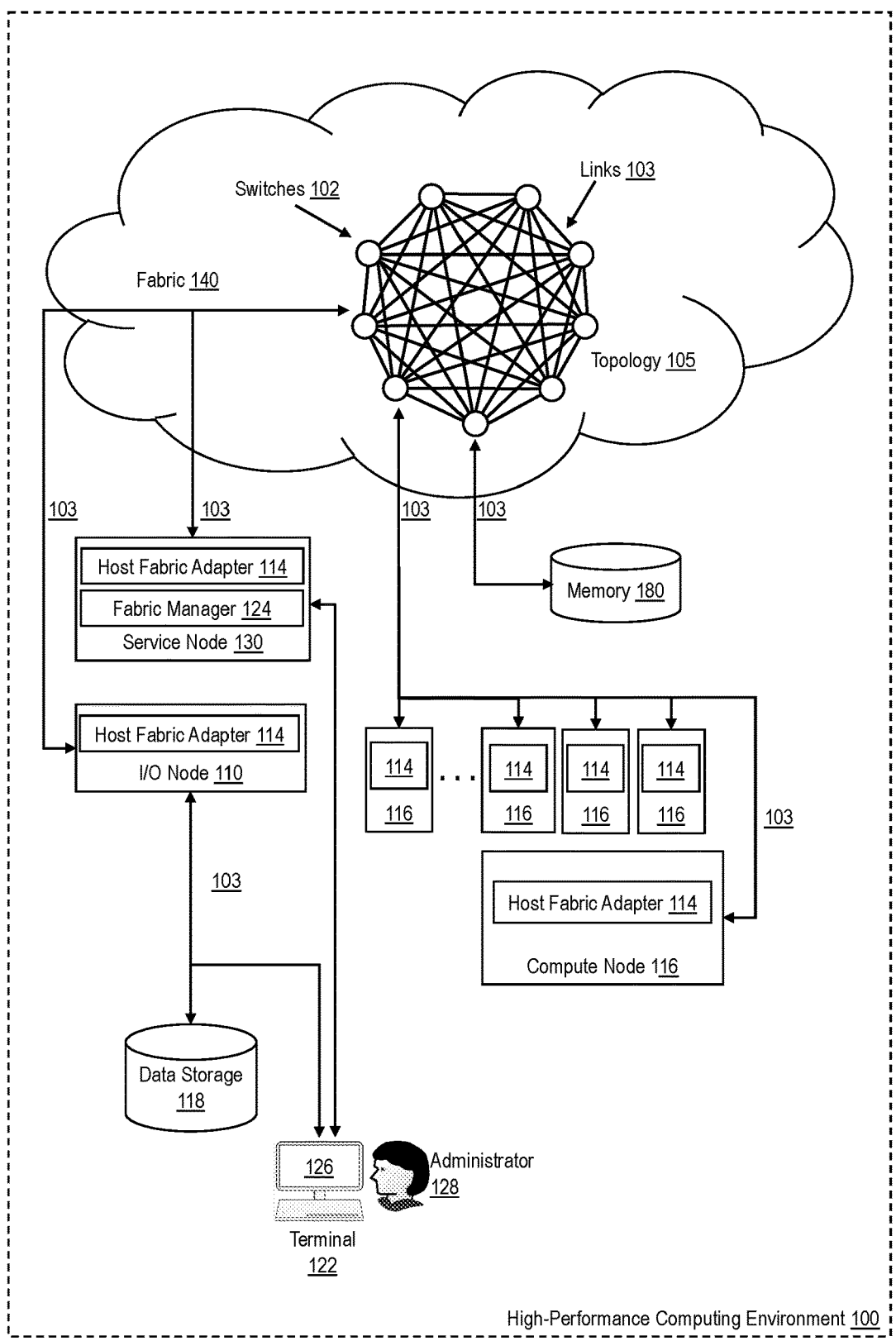
FIG. 1 sets forth a system diagram of an example high-performance computing environment for dynamic port subdivision according to embodiments of the present invention.

Methods, systems, and devices for dynamic port subdivision according to embodiments of the present invention are described with reference to the attached drawings. FIG. 1 sets forth a system diagram of an example high-performance computing environment useful for dynamic port subdivision according to embodiments of the present invention. The example high-performance computing environment of FIG. 1 includes a fabric (140) which includes an aggregation switches (102), links (103), and host fabric adapters ('HFAs') (114) integrating the fabric with the devices that it supports. The fabric (140) according to the example of FIG. 1 is a unified computing system that includes interconnected nodes and switches that often look like a weave or a fabric when seen collectively.

The switches (102) of FIG. 1 are multiport modules of automated computing machinery, hardware and firmware, that receive and transmit packets. Typical switches receive packets, inspect packet header information, and transmit the packets according to routing tables configured in the switch. Often switches are implemented as, or with, one or more application specific integrated circuits ('ASICs'). In many cases, the hardware of the switch implements packet routing and firmware of the switch configures routing tables, performs management functions, fault recovery, and other complex control tasks as will occur to those of skill in the art.

The switches (102) of the fabric (140) of FIG. 1 are connected to other switches with links (103) to form one or more topologies. A topology is a wiring pattern among switches, HFAs, and other components and routing algorithms used by the switches to deliver packets to those components. Switches, HFAs, and their links of the fabric may be connected in many ways to form many topologies, each designed to optimize performance for their purpose. Examples of topologies useful according to embodiments of the present invention include HyperX topologies, Star topologies, Dragonflies, Megaflies, Trees, Fat Trees, and many others.

Links (103) may be implemented as copper cables, fiber optic cables, and others as will occur to those of skill in the art. In some embodiments, the use of double density cables may also provide increased bandwidth in the fabric. Such double density cables may be implemented with optical cables, passive copper cables, active copper cables and others as will occur to those of skill in the art.

The switches of FIG. 1 are configured for dynamic port subdivision according to embodiments of the present invention. During link negotiation and initialization, the switches for FIG. 1 receive configuration information from potential link partners. As discussed in more detail below, the switches of FIG. 1 dynamically subdivide local ports and dynamically further subdivide ports to link up with link partners at the highest mutually supported link width. Depending on the configuration, for example, a 4x port may be dynamically subdivided and further subdivided according to embodiments of the present invention into a number of configurations. The port may be subdivided into two 2x ports, one 2x port and two 1x ports, or four 1x ports, to name a few.

The switches of FIG. 1 dynamically subdivide ports by receiving port configuration information of one or more potential link partners and determining whether the local port is subdivisible by comparing the GUID and port number of a reference lane with the GUID and port number of a subdivision evaluation lane. If they are not the same, the link manager subdivides the port. After subdivision, the subdivision evaluation process described above may be repeated on the subdivided port. This recursive subdivision continues until subdivision is not possible due to system policies, the port having been fully subdivided, or only one lane remaining after subdivision. Port subdivision according to the present invention provides a vehicle for ports to be dynamically linked at their widest mutually supported link width.

The example of FIG. 1 includes a service node (130). The service node (130) provides services common to pluralities of compute nodes, loading programs into the compute nodes, starting program execution on the compute nodes, retrieving results of program operations on the compute nodes, and so on. The service node communicates with administrators (128) through a service application interconnect that runs on computer terminal (122).

The service node (130) of FIG. 1 has installed upon it a fabric manager (124). The fabric manager (124) of FIG. 1 is a module of automated computing machinery for configuring, monitoring, managing, maintaining, troubleshooting, and otherwise administering elements of the fabric (140). The example fabric manager (124) is coupled for data communications with a fabric manager administration module with a user interface ('UI') (126) allowing administrators (128) to configure and administer the fabric manager (124) through a terminal (122) and in so doing configure and administer the fabric (140). In some embodiments of the present invention, routing algorithms are controlled by the fabric manager (124) which in some cases configures routes from endpoint to endpoint.

The fabric manager (124) of FIG. 1 publishes configurations and policies for dynamic subdivision. Such policies may dictate whether a particular port may have some or all of its subdivision capabilities supported, enabled, activated, and so on. Once communicated to the switches and HFAs from the fabric manager, such policies and configurations may be used locally for dynamic port subdivision according to embodiments of the present invention.

The example of FIG. 1 includes an I/O node (110) responsible for input and output to and from the high-performance computing environment. The I/O node (110) of FIG. 1 is coupled for data communications to data storage (118) and a terminal (122) providing information, resources, UI interaction and so on to an administrator (128).

The compute nodes (116) of FIG. 1 operate as individual computers including at least one central processing unit ('CPU'), volatile working memory and non-volatile storage. The hardware architectures and specifications for the various compute nodes vary and all such architectures and specifications are well within the scope of the present invention as will occur to those of skill in the art. Such non-volatile storage may store one or more applications or programs for the compute node to execute.

Each compute node (116) in the example of FIG. 1 has installed upon it a host fabric adapter (114) ('HFA'). An HFA is a hardware component that facilitates communication between a computer system and a network or storage fabric. It serves as an intermediary between the computer's internal bus architecture and the external network or storage infrastructure. The primary purpose of a host fabric adapter is to enable a computer to exchange data with other devices, such as servers, storage arrays, or networking equipment, over a specific communication protocol. HFAs deliver high bandwidth and increase cluster scalability and message rate while reducing latency.

Figure 2:
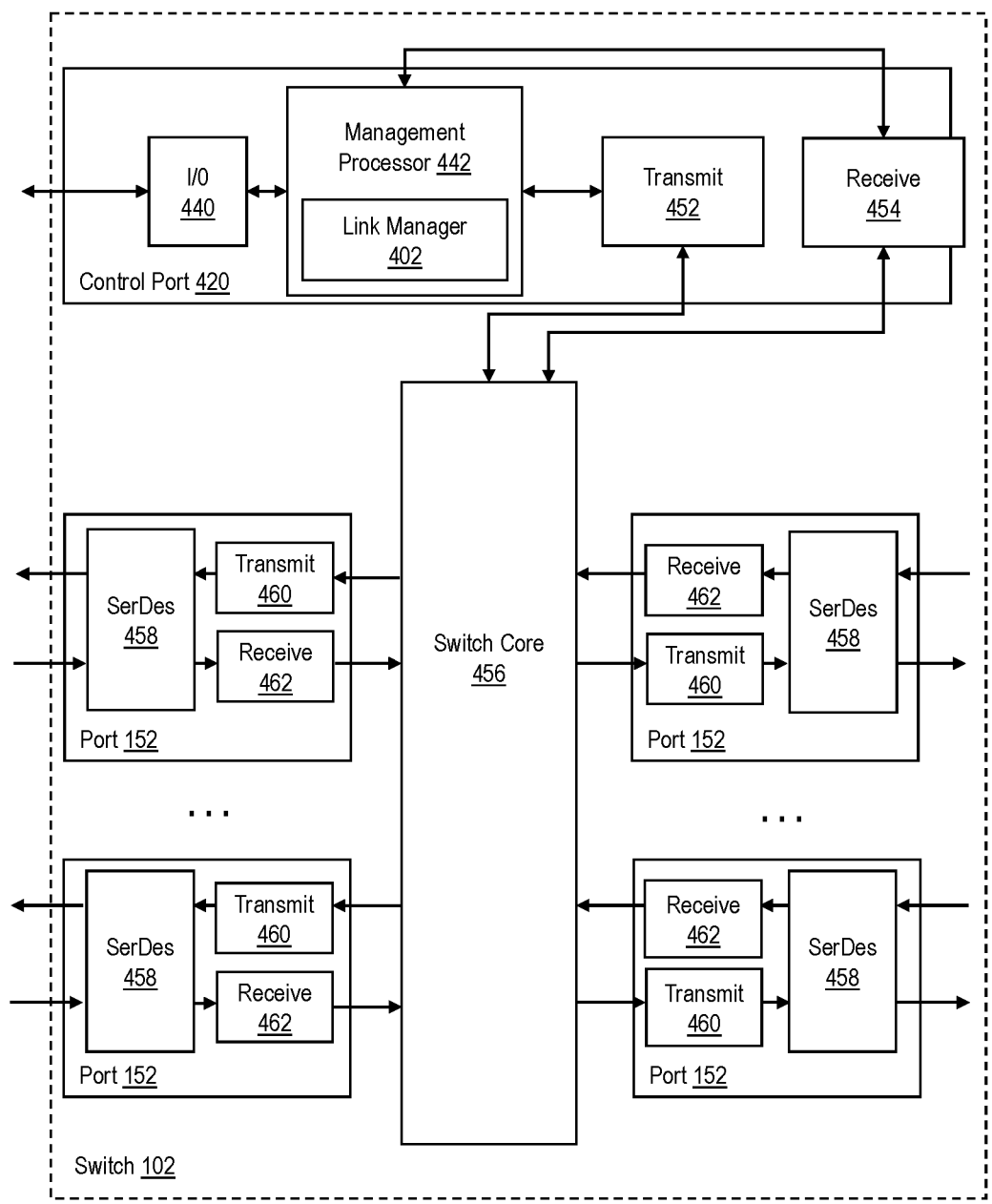
FIG. 2 sets forth a line drawing of a switch configured for dynamic port subdivision according to example embodiments of the present invention.

For further explanation, FIG. 2 sets forth a block diagram of an example switch capable of dynamic port subdivision according to embodiments of the present invention. The example switch (102) of FIG. 2 includes a control port (420), a switch core (456), and a number of ports (152). Each port (152) is coupled with the switch core (456) and a transmit controller (460) and a receive controller (462) and a SerDes (458).

The control port (420) of FIG. 2 includes an input/output ('I/O') module (440), a management processor (442), a transmit controller (452), and a receive controller (454). The management processor (442) of the example switch of FIG. 2 maintains and updates routing tables for the switch. In the example of FIG. 2, each receive controller maintains the latest updated routing tables.

The management processor (442) of FIG. 2 includes a link manager (402). The link manager of FIG. 2 is configured for dynamic port subdivision according to embodiments of the present invention. The link manager of FIG. 2 includes logic configured to subdivide the port into a plurality of subdivided ports if the local port is subdivisible. To do so, the link manager is configured to search a reference lane group and select a lane that is not dead and configured to search a subdivision evaluation group and select a lane that is not dead. The reference lane group includes lanes from the first half of the lanes of the port under evaluation and the subdivision evaluation group includes lanes from the second half of the lanes of the port under evaluation. The term 'port under evaluation' means a port (subdivided or otherwise) whose current lanes are being grouped, searched, and compared to determine whether further subdivision of those lanes is possible.

The link manager of FIG. 2 includes logic configured to compare a GUID and port number of the reference lane with a GUID and port number of a subdivision evaluation lane and configured to subdivide the port into a plurality of subdivided ports if the GUID and port number of a reference lane and the GUID and port number of a subdivision evaluation lane are not the same.

The link manager of FIG. 2 advantageously determines whether to subdivide and how to subdivide the port based on received port configuration information from its potential link partners without further communication. If the local port is subdivisible based upon the received configuration information, the link manager subdivides the port into a plurality of subdivided ports. If the local port is not subdivisible, the link manager proceeds with link negotiation and initialization without subdivision.

In some cases, subdivided ports may be further subdivided. The link manager therefore determines whether the subdivided port is further subdivisible and if the subdivided port is further subdivisible, further subdividing the subdivided port. If the subdivided port is not further subdivisible, the link manager transmits the port configuration information for the subdivided port to potential link partners to link at the subdivide link width.

Figure 3:
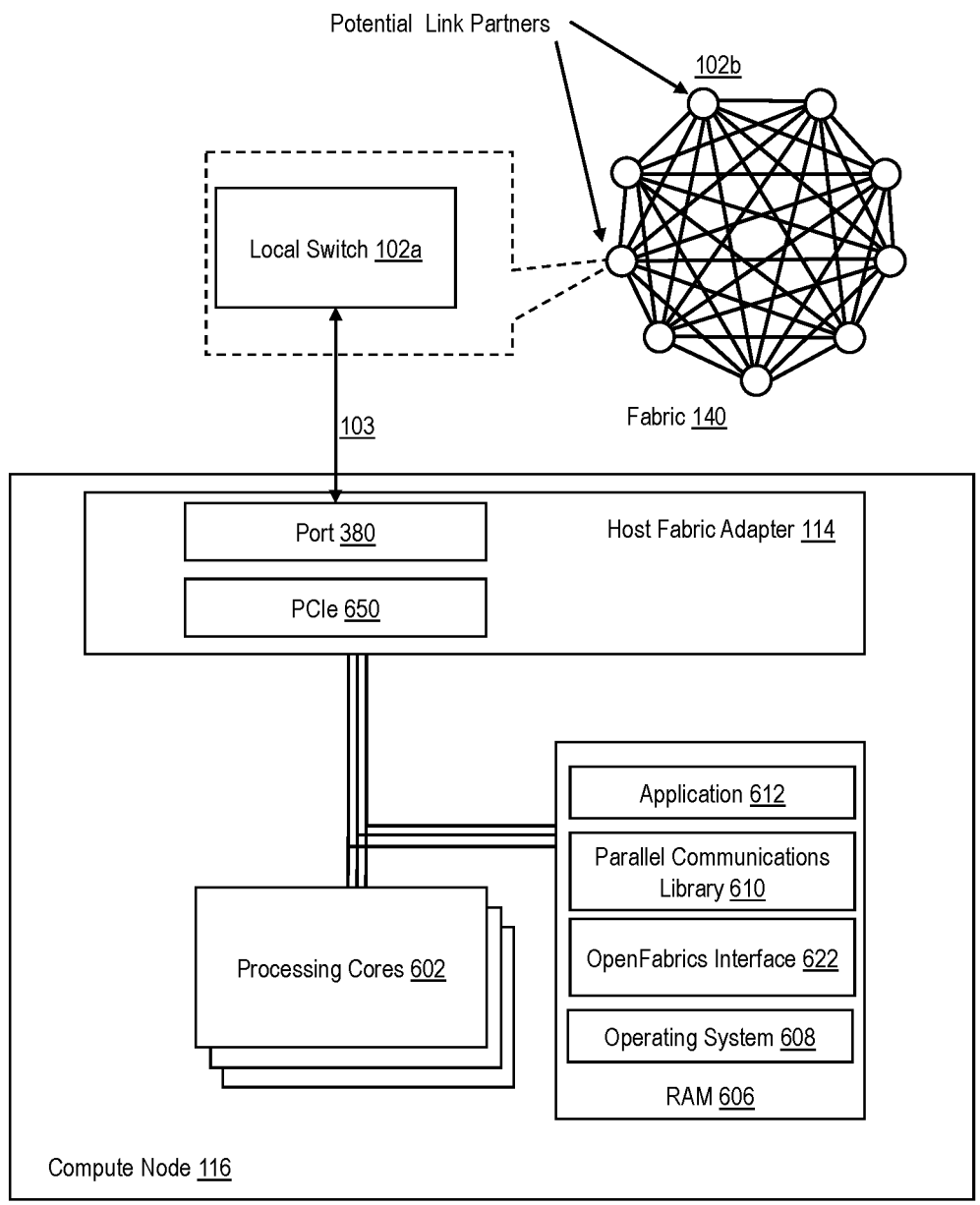
FIG. 3 sets forth a block diagram of a compute node configured for dynamic port subdivision according to embodiments of the present invention.

For further explanation, FIG. 3 sets forth a block diagram of a compute node including a host fabric adapter (114) according to embodiments of the present invention. The compute node (116) of FIG. 3 includes processing cores (602), random access memory ('RAM') (606) and a host fabric adapter (114). The example compute node (116) is coupled for data communications with a fabric (140) through a link (103) configured according to the present invention.

Stored in RAM (606) in the example of FIG. 3 is an application (612), a parallel communications library (610), an OpenFabrics Interface module (622), and an operating system (608). Applications for high-performance computing environments, artificial intelligence, and other complex environments are often directed to computationally intense problems of science, engineering, business, and others. A parallel communications library (610) is a library specification for communication between various nodes and clusters of a high-performance computing environment. A common protocol for HPC computing is the Message Passing Interface ('MPI'). MPI provides portability, scalability, and high-performance. MPI may be deployed on many distributed architectures, whether large or small, and each operation is often optimized for the specific hardware on which it runs.

OpenFabrics Interfaces (OFI), developed under the OpenFabrics Alliance, is a collection of libraries and applications used to export fabric services. The goal of OFI is to define interfaces that enable a tight semantic map between applications and underlying fabric services. The OFI module (622) of FIG. 3 packetizes the message stream from the parallel communications library for transmission.

The compute node of FIG. 3 includes a host fabric adapter (114). The HFA (114) of FIG. 3 includes a PCIe interconnect (650) or other such interconnect as will occur to those of skill in the art and a port (380). The port (380) is coupled for data communications with a number of potential link partners (102a and 102b). The HFA of FIG. 3 is configured for dynamic port subdivision according to embodiments of the present invention.

Figure 4:
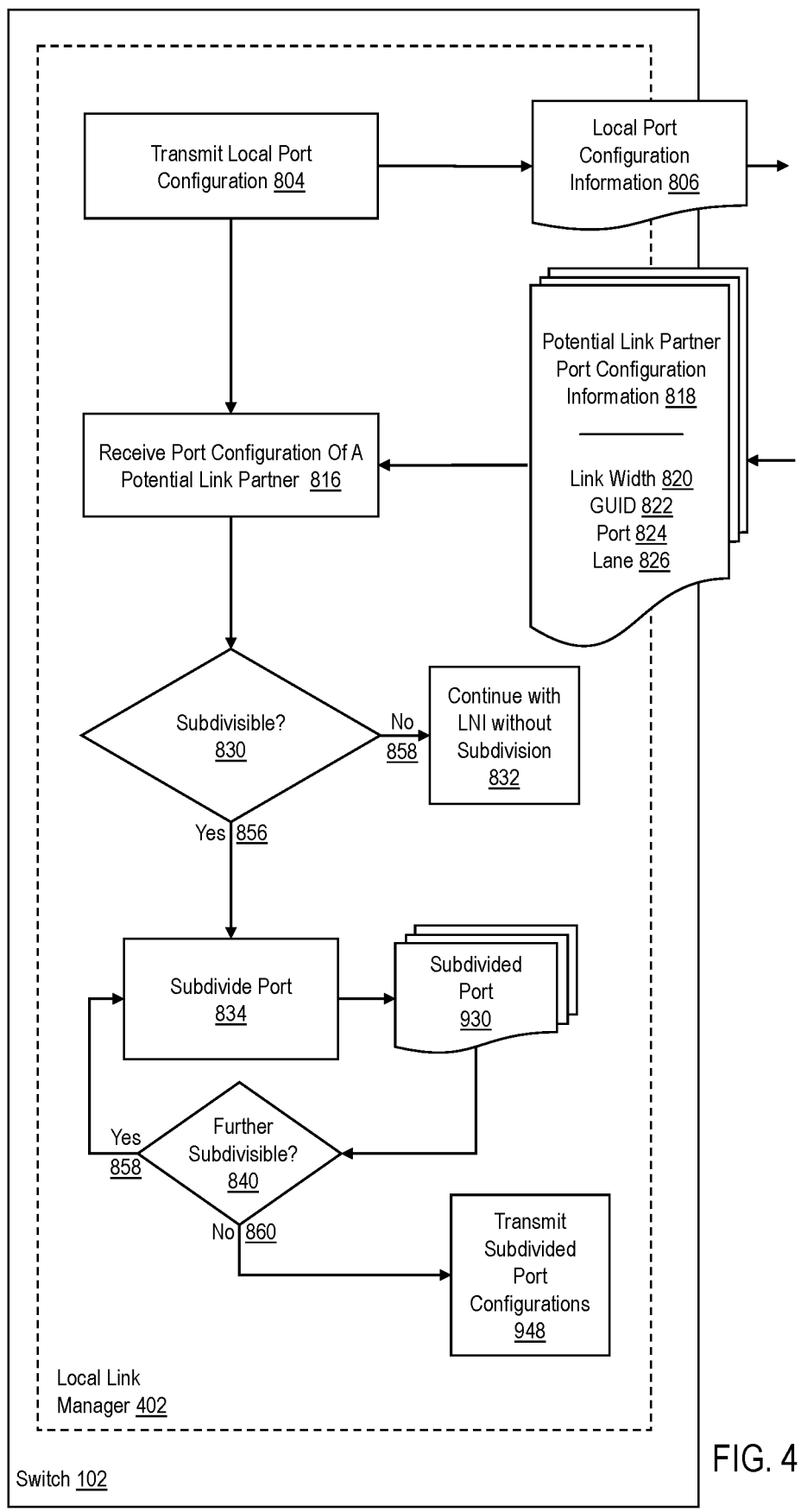
FIG. 4 sets forth a flowchart illustrating an example method for dynamic port subdivision according to embodiments of the present invention.

For further explanation, FIG. 4 sets forth a flow chart illustrating an example method of dynamic port subdivision during link negotiation and initiation according to embodiments of the present invention. As mentioned above, during LNI, switches exchange information about their capabilities and establish a common configuration for the connection. The method of FIG. 4 therefore includes transmitting (804), by the local link manager (402), local port configuration information (806) including maximum supported link width, GUID, port number, and lane number. Furthermore, for each port administered by the local link manager, the method of FIG. 4 also includes receiving (816) port configuration information (818) of one or more potential link partners. The received port configuration information (818) include maximum supported link width (820), GUID (822), port number (824), and lane number (826).

The method of FIG. 4 includes determining (830), by the local link manager (402) in dependence upon the transmitted local port configuration (806), whether the local port is subdivisible. As discussed in more detail below with reference to FIG. 5, determining whether the local port is subdivisible includes comparing the GUID and port number of selected lanes and subdividing the port if the GUIDs and port numbers are not the same.

If the local port is not subdivisible (858), the method of FIG. 4 includes maintaining (832) current link width with no subdivision and proceeding with link negotiation and initialization. If the local port is subdivisible (856), however, the method of FIG. 4 includes subdividing (834) the port into a plurality of subdivided ports (930). Subdividing (834) the port into a plurality of subdivided ports (930) includes creating virtual port configurations for the subdivided port including assigning a virtual port number and virtual lane number to the lanes of the subdivided port.

As discussed above, in some cases subdivided ports may be further subdivisible. For each of the plurality of subdivided ports, therefore, the method of FIG. 4 includes determining (840) whether each of the subdivided ports (930) is further subdivisible. Determining (840) whether the subdivided port (930) is further subdivisible is carried out in a manner similar to determining (830) whether the native port width was subdivisible by comparing the GUID and port number of a reference lane and a subdivision evaluation lane of the subdivided port. If the subdivided port is further subdivisible (858), the method of FIG. 4 includes further subdividing (834) the subdivided port and if the subdivided port is not further subdivisible (860), the method of FIG. 4 includes transmitting (948) port configuration information for the subdivided port to potential link partners.

Figure 5:
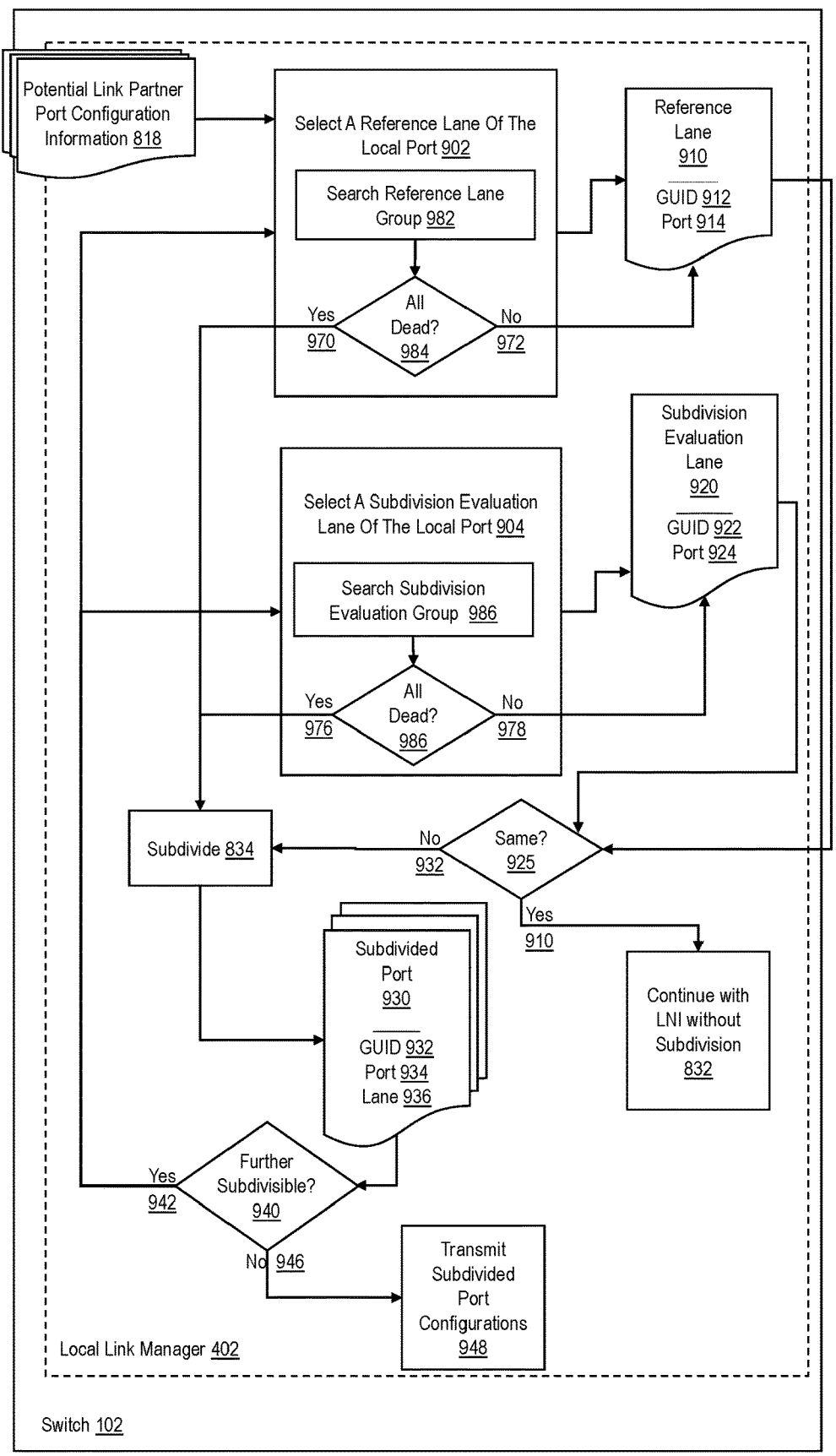
FIG. 5 sets forth a flowchart illustrating an example method for determining whether a port is subdivisible according to embodiments of the present invention.

For further explanation, FIG. 5 sets forth an example method for determining (830) whether the local port is subdivisible. The method of FIG. 5 includes selecting (902) a reference lane (910) from the port configuration information for the potential link partner and selecting (904) a subdivision evaluation lane (920) from the port configuration information for the potential link partner. A reference lane (910) is a lane selected from the port configuration information to be compared with another lane, the subdivision evaluation lane (920), to determine if both selected lanes are reported by potential link partner that has the same GUID (912 and 922) and port number (914 and (924) and also supports the link width currently being evaluated for subdivision. As discussed below, if they are the same, LNI continues without subdivision, if they are not the same, the port may be subdivisible. Selection of the reference lane and the subdivision evaluation lane therefore may be carried out strategically to efficiently determine whether the port under evaluation is subdivisible.

Ports subdivided according to the present invention are typically subdivided and further subdivided by bifurcation at each stage of subdivision. For example, a 4x port may be divided into two 2x ports and further subdivided into one 2x port and two 1x ports. As such, the relevant lanes for comparison, the reference lane (910) and the subdivision evaluation lane (920) may be strategically selected from different groups of lanes—a reference lane group including the first half of the lanes of the port under evaluation and a subdivision evaluation group including the second half of the lanes. Selecting lanes from each of these groups efficiently identifies lanes for determining whether the port is subdivisible.

A lane cannot be properly evaluated for subdivision evaluation if it is dead. Selecting (902) a reference lane (910) according to the method of FIG. 5 therefore includes searching (982) a reference lane group and selecting a lane that is not dead (972). Similarly, selecting (904) a subdivision evaluation lane (920) includes searching (906) a subdivision evaluation group and selecting a lane that is not dead (978).

Having selected a lane from each group that is not dead, the method of FIG. 5 includes comparing (925) the GUID (912) and port number (914) of the reference lane (910) with the GUID (922) and port number (924) of a subdivision evaluation lane (920). If the GUID (912) and port number (914) of a reference lane (910) and the GUID (922) and port number (924) of a subdivision evaluation lane (920) are the same (925), the method of FIG. 5 includes maintaining (832) current link width with no subdivision and proceeding with link negotiation and initialization. If the GUID (912) and port number (914) of a reference lane (910) and the GUID (922) and port number (924) of a subdivision evaluation lane (920) are not the same (932), the method of FIG. 5 includes subdividing (834) the port into a plurality of subdivided ports.

As just mentioned above, a lane cannot be properly evaluated if it is dead. When searching (982) a reference lane group identifies that all the lanes of the reference lane group are dead (970), or all the lanes of the subdivision evaluation group are dead (976) the method of FIG. 5 proceeds to subdivide (834) the port because the corresponding link partner may be powered down or disabled. As with the method of FIG. 4, the method of FIG. 5 includes determining (940) if the subdivided port (930) is further subdivisible and recursively subdividing ports according to embodiments of the present invention until all ports under evaluation are not subdivisible.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamic port subdivision during link negotiation and initiation, the method comprising;
   for each local port, receiving, by the local link manager, port configuration information of one or more potential link partners,
      wherein the port configuration information include maximum supported link width, GUID, port number, and lane number;
   determining, by the local link manager in dependence upon the received port configuration information, whether the local port is subdivisible;
   if the local port is subdivisible, subdividing the port into a plurality of subdivided ports;
   if the local port is not subdivisible, maintaining current link width with no subdivision and proceeding with link negotiation and initialization.

2. The method of claim 1 wherein determining whether the local port is subdivisible further comprises:
   selecting a reference lane from the port configuration information for the potential link partner;
   selecting a subdivision evaluation lane from the port configuration information for of the potential link partner;
   comparing a GUID and port number of the reference lane with a GUID and port number of a subdivision evaluation lane; and
   if the GUID and port number of a reference lane and the GUID and port number of a subdivision evaluation lane are the same, maintaining current link width with no subdivision and proceeding with link negotiation and initialization;
   if the GUID and port number of a reference lane and the GUID and port number of a subdivision evaluation lane are not the same, subdividing the port into a plurality of subdivided ports.

3. The method of claim 2 wherein selecting a reference lane further comprises searching a reference lane group and selecting a lane that is not dead and selecting a subdivision evaluation lane further comprises searching subdivision evaluation group and selecting a lane that is not dead.

4. The method of claim 3 wherein the reference lane group comprises lanes from a first half of the lanes of the port under evaluation and the subdivision evaluation group comprises lanes from a second half of the lanes of the port under evaluation.

5. The method of claim 1 wherein, for each of the plurality of subdivided ports, determining whether the subdivided port is further subdivisible and if the subdivided port is further subdivisible, further subdividing the subdivided port; and if the subdivided port is not further subdivisible, transmitting port configuration information for the subdivided port to potential link partners.

6. The method of claim 1 further comprising searching a reference lane group and subdividing the port if all lanes of the reference group are dead.

7. The method of claim 1 further comprising searching a subdivision evaluation group and subdividing the port if all lanes of the subdivision evaluation group are dead.

8. The method of claim 1 wherein subdividing the port further comprises creating virtual port configuration information for the subdivided port including assigning a virtual port number and virtual lane number to the lanes of the subdivided port.

9. A switch comprising:
   a plurality of ports including a transmit controller and a receive controller;
   a switch core; and
   a control port comprising a management processor, wherein the management processor comprises a link manager comprising logic configured to subdivide the port into a plurality of subdivided ports if local port is subdivisible.

10. The switch of claim 9 wherein the link manager comprises logic configured to search a reference lane group and select a lane that is not dead and configured to search a subdivision evaluation group and select a lane that is not dead.

11. The switch of claim 10 wherein the reference lane group comprises lanes from a first half of the lanes of the port under evaluation and the subdivision evaluation group comprises lanes from a second half of the lanes of the port under evaluation.

12. The switch of claim 9 where the link manager further comprises logic configured to compare a GUID and port number of the reference lane with a GUID and port number of a subdivision evaluation lane and configured to subdivide the port into a plurality of subdivided ports if the GUID and port number of a reference lane and the GUID and port number of a subdivision evaluation lane are not the same.

13. The switch of claim 9 wherein the link manager comprises logic configured to search a reference lane group and subdivide the port under evaluation if all lanes of the reference lane group are dead.

14. The switch of claim 9 wherein the link manager comprises logic configured to search a subdivision evaluation group and subdivide the port if all lanes of the subdivision evaluation group are dead.

15. The switch of claim 9 wherein the link manager comprises logic to further subdivide the port if the subdivided port is further subdivisible.

16. The switch of claim 9 wherein the link manager further comprises logic configured to subdivide the port including creating virtual port configuration information for the subdivided port.

17. A method of dynamic port subdivision during link negotiation and initiation, the method comprising;
   selecting a reference lane from port configuration information for the potential link partner;
   selecting a subdivision evaluation lane from the port configuration information for of the potential link partner;
   comparing a GUID and port number of the reference lane with a GUID and port number of a subdivision evaluation lane; and
   if the GUID and port number of a reference lane and the GUID and port number of a subdivision evaluation lane are not the same, subdividing the port into a plurality of subdivided ports.

18. The method of claim 17 wherein selecting a reference lane further comprises searching a reference lane group and selecting a lane that is not dead and selecting a subdivision evaluation lane further comprises searching subdivision evaluation group and selecting a lane that is not dead.

19. The method of claim 18 wherein the reference lane group comprises lanes from a first half of the lanes of the port under evaluation and the subdivision evaluation group comprises lanes from a second half of the lanes of the port under evaluation.

20. The method of claim 17 wherein subdividing the port further comprises creating virtual port configuration information for the subdivided port including assigning a virtual port number and virtual lane number to the lanes of the subdivided port.

* * * * *